United States Patent [19]

Kostura et al.

[11] 4,072,181

[45] Feb. 7, 1978

[54] APPARATUS FOR REGULATING THE TEMPERATURE OF A CASTING MOLD

[75] Inventors: Michal Kostura; Jan Pandula; Absolon Harmansky; Slavomir Smiga; Stefan Kepic, all of Snina, Czechoslovakia

[73] Assignee: Vihorlat, narodny podnik, Snina, Czechoslovakia

[21] Appl. No.: 735,808

[22] Filed: Oct. 26, 1976

[30] Foreign Application Priority Data

Oct. 24, 1975   Czechoslovakia .................. 7193/75

[51] Int. Cl.² ............................................. B22D 17/32
[52] U.S. Cl. ............................... 164/154; 164/338 M; 425/144; 165/105; 165/30
[58] Field of Search .............. 164/154, 4, 338 M, 348; 425/144, 135, 143; 165/30, 105, 48

[56] References Cited

U.S. PATENT DOCUMENTS

| | | |
|---|---|---|
| 3,259,175 | 7/1966 | Kraus et al. .................. 425/144 UX |
| 3,358,743 | 12/1967 | Adams .................................. 164/154 |
| 3,874,439 | 4/1975 | Korshanov et al. .............. 164/154 X |

FOREIGN PATENT DOCUMENTS

| | | | |
|---|---|---|---|
| 2,005,835 | 12/1969 | France ................................. 425/144 |
| 514,875 | 1930 | Germany ......................... 164/338 M |

*Primary Examiner*—J. Howard Flint, Jr.

[57] ABSTRACT

A serial flow of a variable-boiling point volatile fluid is established through the wall of a casting mold and through a heater and condenser associated therewith by means of a pump. The condenser includes a lower portion in the path of flow of the volatile liquid, and an upper portion through which an auxiliary conduit extends, such conduit conveying a variable flow of coolant through the upper condenser portion. Changes in vapor pressure of the volatile liquid as the temperature in the mold changes are detected in the upper portion of the condenser by a suitable sensing device, and the output indication of the latter is employed to control a regulating valve for the auxiliary conduit to vary the flow of coolant in the auxiliary conduit. Such variations in flow, in turn, serve to adjust the vapor pressure, and thus the boiling point, of the volatile liquid and to thereby help compensate for temperature changes in the casting mold.

5 Claims, 1 Drawing Figure

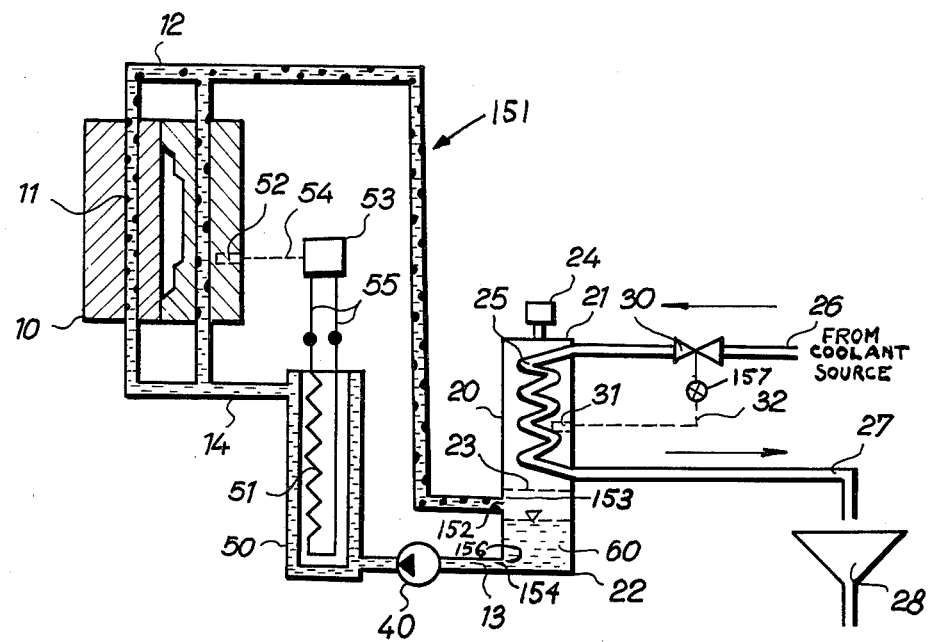

APPARATUS FOR REGULATING THE TEMPERATURE OF A CASTING MOLD

BACKGROUND OF THE INVENTION

The invention relates to arrangements including a volatile coolant for automatically regulating the temperature of a casting mold.

In one advantageous arrangement of this type, a conduit extending through the wall of the casting mold for conveying a volatile coolant therethrough is connected in parallel to a cooling circuit including a condenser, which removes heat from the mold during the casting operation, and a separate heating circuit which is connected in parallel to the cooling circuit. A pump associated with the heating circuit circulates the volatile fluid through the mold, and a suitable temperature sensing element in the mold wall regulates the thermal output of the heating element, and thus the fluid temperature in the associated portion of the conduit when the temperature in the mold varies outside of predetermined limits.

Generally, the condenser in the cooling circuit is so situated that the portion of the volatile fluid in the mold proper is maintained in the liquid phase having a fixed boiling point.

One disadvantage of such arrangement is that the parallel association of the heating and cooling circuits results in a complicated and expensive construction. In addition, flexibility in the degree of cooling of the mold is quite limited in such arrangement because of the essentially fixed boiling point of the volatile liquid.

SUMMARY OF THE INVENTION

Such disadvantages are overcome with the casting mold cooling arrangement of the invention. In an illustrative embodiment, the cooling circuit and the heating circuit are essentially coupled in series with the conduit extending through the casting mold for conveying the volatile liquid, with the resulting serial flow of the various phases of the volatile fluid being continually maintained by a pump which is situated between the condenser and the heating element of the arrangement. Consequently, the expense necessary in the prior art for maintaining separate, parallel-connected heating and cooling circuits is obviated.

The condenser employed in the inventive arrangement is a hollow chamber which is vertically divided, by a suitable condensation grid, into an upper portion and a lower portion. The lower portion, which includes a reservoir of the volatile fluid, is in the serial path of flow of the fluid through the casting mold. The liquid-free upper portion of the condenser above the grid has an auxiliary cooling conduit extending therethrough, such conduit having a regulatable flow valve therein for establishing an adjustable flow of a separate coolant through the upper portion. A suitable sensor disposed in the upper portion yields an indication that varies in proportion to changes in the instantaneous vapor pressure in the upper portion of the condenser, which changes are in turn proportional to changes in the amount of heat transferred from the mold wall to the volatile liquid. Changes in the indication generated by such sensor are suitably translated into an adjustment signal for the flow valve in the auxiliary conduit. Such adjustment signal is arranged to vary the flow of the coolant in a direction to compensate for the change of vapor pressure in the upper portion of the condenser, thereby causing a corresponding raising or lowering of the boiling point of the portion of the volatile fluid passing through the mold. Such change in boiling point will be accompanied by an altered heat transfer from the mold wall, thereby resulting in a regulation of the mold temperature.

BRIEF DESCRIPTION OF THE DRAWING

The invention is further set forth in the following detailed description taken in conjunction with the appended drawing, in which the single FIGURE is a schematic representation of an arrangement for regulating the temperature of a casting mold in accordance with the invention.

DETAILED DESCRIPTION

Referring now to the drawing, there is depicted a conventional casting mold 10, whose wall temperature is regulated by the facilities to be described. A suitable volatile coolant, such as ethyl glycol, is conveyed through the casting mold 10 by means of a composite conduit 151. The conduit includes a pair of channels 11 that respectively extend through the upper and lower portions of the casting mold 10, the channels 11 being joined at their respectively opposite ends to a supply conduit portion 14 and a collection conduit portion 12.

The downstream end of the collecting conduit portion 12 terminates in communication with a lower portion 22 of a condenser 20, which is embodied as a vertically disposed hollow cylinder as shown.

In particular, the downstream conduit end 152 is aligned with a relatively high point 153 in the lower condenser portion 22, at a location slightly above the upper surface of a reservoir 60 of the volatile fluid. An upstream end 154 of the conduit 151 extends outwardly from a relatively low point 156 of the lower condenser portion 22, and extends through a pump 40 to the supply portion 14 of the conduit 151. A regulatable heater 51 is associated with a portion 50 of the conduit 151 intermediate the pump 40 and the supply portion 14. The purpose of the pump 40 is to maintain a serial flow of the volatile coolant through the conduit 151 and the lower condenser portion 22 as shown, with the heated portion 50 of the conduit being situated in such serial path.

During the casting operation, the temperature of the wall of the mold 10 is sensed by a feeling element 52, which communicates over a link 54 to a thermal supply unit 53. The supply unit 53, in turn, is coupled over leads 55 to the heater 51, which may be embodied as a resistance coil. With such arrangement, the ethyl glycol within the conduit section 50 is ideally maintained at a temperature which is optimally suited to the desired casting characteristics of the metal or plastic in the mold 10.

The heat-control elements 51- 55 are conventionally arranged so that upon a decrease of the temperature of the mold wall as sensed by the feeler 52 drops below a predetermined range, the thermal output of the heating coil 51 will be increased to raise the temperature of the volatile fluid through the channels 11, thereby restoring the desired temperature range of the mold.

In addition, the flow of ethyl glycol through the channels 11 serves to draw heat away from the mold walls by evaporation. In particular, the subjection of the flowing fluid to the heat of the mold walls will cause the fluid to evaporate within the channels 11, and the heat of evaporation will tend to decrease the temperature of the mold walls by a factor proportional to the rate of heat transfer, and thereby to the then-occurring boiling point temperature of the fluid. The gaseous phase of the fluid, flowing through the collecting conduit 12, is coupled into the condenser 20 via the inlet 153.

In order to condense such gaseous phase, a cooling conduit 25 extends into an upper portion 21 of the condenser 20. The upper portion 21, which is separated from the lower portion 22 by means of a condensing grid 23, has a safety valve 24 associated with the upper end thereof.

A suitable coolant, such as water, is introduced from a suitable supply source to an inlet portion 26 of the auxiliary conduit 25, where its rate of flow is regulated by an adjustable valve 30. The water leaving the conduit 25 in the upper condenser portion 21 is conveyed into a drain 28 via a discharge conduit portion 27. The resultant cooling of the gaseous phase of the ethyl glycol, effected by the conduit 25, serves to condense the gaseous phase of the volatile fluid, and the resultant condensate is collected in the reservoir 60 in the lower portion 22 of the condenser.

The vapor pressure in the upper portion 21 of the condenser 20 is proportional to the temperature obtained by the gaseous phase of the ethyl glycol flowing through the discharge portion 12 of the conduit 151. Such vapor pressure, then, will be a measure of the rate of heat transfer from the mold wall to the ethyl glycol, and thereby to the temperature of the mold wall itself. Any increase in the temperature of the mold wall beyond a desired range will then be manifested by an increase in vapor pressure in the upper condenser portion 21, which changes will be sensed by a detecting element 31. A proportional increase in the output of the detecting element 31 will be applied, through a line 32 and a control transducer 157, to the regulating input of the adjustable flow valve 30. The direction of adjustment is such as to increase the rate of flow of coolant through the auxiliary conduit 25, to alter the vapor pressure in the upper portion 21 of the condenser 20.

Such change in vapor pressure will correspondingly change the boiling point of the liquid phase of the ethyl glycol in a direction to increase the rate of heat transfer from the mold walls to the fluid in the channels 11 and to thereby decrease the temperature of the mold wall to a value within the desired range. A similar effect, of course, will occur when the temperature of the mold wall falls below a value in the desired range.

In the foregoing, an illustrative arrangement of the invention has been described. Many variations and modifications will now occur to those skilled in the art. It is accordingly desired that the scope of the appended claims not be limited to the specific disclosure herein contained.

We claim:

1. In an arrangement for regulating the temperature of a casting mold, a casting mold having a wall, first conduit means having upstream and downstream ends and a first portion and extending through the wall of the casting mold for conveying a first volatile fluid to remove heat from the mold wall at a rate related to the then-occurring boiling point of the first fluid, condenser means including a hollow chamber having an upper portion and a lower portion in fluid communication, the upstream end of the first conduit means terminating in a first relatively low point of the lower portion of the condenser means and the downstream end of the first conduit means terminating in a second relatively high point of the lower portion, second conduit means extending into the upper portion of the condenser means for conveying a second cooling fluid through said upper portion, regulatable heater means associated with a first portion of the first conduit means between the upstream end thereof and the casting mold for selectively heating the associated first portion, and pump means serially disposed in the path of the first conduit means for maintaining a serial flow of the first fluid through the first conduit means and the lower portion of the condenser means.

2. An arrangement as defined in claim 1, in which the pump means is situated in the path of the first conduit means between the upstream end thereof and the first portion.

3. An arrangement as defined in claim 1, further comprising sensing means coupled to the wall of the casting mold for generating an indication proportional to the temperature of the mold wall, and control means coupled to the heater means and responsive to changes in the indication of the sensing means for adjusting the thermal output of the heater means to correspondingly vary the temperature of the first fluid in the first portion of the first conduit means.

4. An arrangement as defined in claim 1, further comprising detecting means in communication with the upper portion of the condenser means for providing an indication proportional to the vapor pressure in the upper portion, regulating valve means disposed in the second conduit means for varying the flow of the second fluid in the second conduit means, and control means responsive to changes in the indication from the detecting means for automatically adjusting the regulating valve means to proportionally vary the flow of the second fluid.

5. An arrangement as defined in claim 1, in which the condenser means further comprises a condensing grid extending across the interface between the upper and lower portions thereof.

* * * * *